United States Patent
Brennan et al.

(10) Patent No.: US 10,628,885 B2
(45) Date of Patent: Apr. 21, 2020

(54) SYSTEMS AND METHODS FOR PREVENTION OF MANIPULATION AND GAMING IN ELECTRONIC INTRADAY AUCTIONS

(71) Applicant: Goldman Sachs & Co. LLC, New York, NY (US)

(72) Inventors: Paul M. Brennan, London (GB); Charles Broussin, London (GB)

(73) Assignee: Goldman Sachs & Co. LLC, New York, NY (US)

( * ) Notice: Subject to any disclaimer, the term of this patent is extended or adjusted under 35 U.S.C. 154(b) by 25 days.

(21) Appl. No.: 15/961,684

(22) Filed: Apr. 24, 2018

(65) Prior Publication Data
US 2018/0308163 A1    Oct. 25, 2018

Related U.S. Application Data

(60) Provisional application No. 62/488,902, filed on Apr. 24, 2017.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
CPC ............................... G06Q 40/04; G06Q 40/06
See application file for complete search history.

(56) References Cited

U.S. PATENT DOCUMENTS

| | | |
|---|---|---|
| 2006/0015441 A1 | 1/2006 | Burkhardt et al. |
| 2010/0268638 A1 | 10/2010 | Wunsch et al. |
| 2012/0066109 A1 | 3/2012 | Riseman et al. |

(Continued)

FOREIGN PATENT DOCUMENTS

EP    1256895 A1    11/2002

OTHER PUBLICATIONS

Manahov, Victor, 2016, A Note on the Relationship Between High Frequency Trading and Latency Arbitrage, International Review of Financial Analysis. (Year: 2016).*

(Continued)

*Primary Examiner* — Olabode Akintola
*Assistant Examiner* — Brandon M Duck
(74) *Attorney, Agent, or Firm* — Fenwick & West LLP

(57) ABSTRACT

This disclosure provides systems and methods for prevention of manipulation and gaming in electronic intraday auctions. The system includes using at least one processing device for obtaining orders related to an asset from an electronic trading system. The system includes using at least one processing device for identifying a value for the asset to be used during an intraday auction involving the asset. The identified value is based on a detected order cross within the orders. The value is identified and set prior to the intraday auction. The value is located within a best bid and best offer spread (BBO) band. The system includes using at least one processing device for initiating the intraday auction involving the asset based on the identified and set value and the detected order cross. Changes to the BBO band during the intraday auction do not affect the identified and set value.

20 Claims, 12 Drawing Sheets

(56) References Cited

U.S. PATENT DOCUMENTS

2012/0179593 A1* 7/2012 Sheldon ................ G06Q 40/04
                                                  705/37
2014/0149273 A1* 5/2014 Angell .................. G06Q 40/04
                                                  705/37

OTHER PUBLICATIONS

PCT International Search Report and Written Opinion, PCT Application No. PCT/US2018/029199, Jul. 19, 2018, 6 pages.
European Patent Office, Extended European Search Report and Opinion, European Patent Application 18742391.8, dated Jun. 25, 2019, eight pages.

* cited by examiner

| BID | | LIMIT PRICE | ASK | | EXECUTABLE QTY |
|---|---|---|---|---|---|
| BUY REF | VOLUME | | SELL REF | VOLUME | |
| | | 11 | | | 0 |
| | | 10.5 | | | 0 |
| O3 | 75 | 10 | | | 75 |
| O2 | 100 | 9.5 | | | 175 |
| O1 | 25 | 9 | | | 200 |
| | | 8.5 | | | 200 |
| | | 8 | O4 | 200 | 200 |
| | | 7.5 | | | 0 |
| | | 7 | | | 0 |
| | | 6.5 | | | 0 |
| | | 6 | | | 0 |
| | | 5.5 | | | 0 |

US 10,628,885 B2

SYSTEMS AND METHODS FOR PREVENTION OF MANIPULATION AND GAMING IN ELECTRONIC INTRADAY AUCTIONS

CROSS-REFERENCE TO RELATED APPLICATION AND CLAIM OF PRIORITY

The present application is related to and claims the priority under 35 U.S.C. § 119(a) to U.S. Application Ser. No. 62/488,902 filed in the U.S. Patent and Trademark Office on Apr. 24, 2017, the entire content of which is hereby incorporated by reference.

TECHNICAL FIELD

This disclosure relates generally to computing systems and more specifically to systems and methods for prevention of manipulation and gaming in electronic intraday auctions.

BACKGROUND

Electronic platforms that are provided by various organizations to support intraday auctions for valuable instruments. Intraday auctions refer to auctions that are conducted for valuable instruments during normal trading hours for those valuable instruments. Intraday auctions can be useful, for example, to help improve the liquidity of certain assets. Unfortunately, when auctions last throughout the day, algorithms used to identify values for the valuable instruments being auctioned can become subject to manipulation through millisecond and sub-millisecond access to the electronic platform. As a result, the algorithms may not be able to identify proper values for the valuable instruments being auctioned.

SUMMARY

This disclosure provides systems and methods for prevention of manipulation in electronic intraday auctions.

In a first embodiment, a method includes using at least one processing device for obtaining orders related to an asset from an electronic trading system. The method also includes using at least one processing device for identifying a value for the asset to be used during an intraday auction involving the asset. The identified value is based on a detected order cross within the orders. The value is identified and set prior to the intraday auction. The value is located within a best bid and best offer spread (BBO) band. The method also includes using at least one processing device initiating the intraday auction involving the asset based on the identified and set value and the detected order cross. Changes to the BBO band during the intraday auction do not affect the identified and set value.

In a second embodiment, an apparatus at least one processing device and at least one memory storing instructions. When executed by the at least one processing device, the at least one processing device performs obtaining orders related to an asset from an electronic trading system. The at least one processing device also performs identifying a value for the asset to be used during an intraday auction involving the asset. The identified value is based on a detected order cross within the orders. The value is identified and set prior to the intraday auction. The value is located within a best bid and best offer spread (BBO) band. The at least one processing device also performs initiating the intraday auction involving the asset based on the identified and set value and the detected order cross. Changes to the BBO band during the intraday auction do not affect the identified and set value.

In a third embodiment, a non-transitory computer readable medium contains instructions that, when executed by at least one processing device, cause the at least one processing device to perform obtaining orders related to an asset from an electronic trading system. The instructions also cause the at least one processing device to perform identifying a value for the asset to be used during an intraday auction involving the asset. The identified value based on a detected order cross within the orders, wherein the value is identified and set prior to the intraday auction. The value is located within a best bid and best offer spread (BBO) band. The instructions also cause the at least one processing device to perform initiating the intraday auction involving the asset based on the identified and set value and the detected order cross. Changes to the BBO band during the intraday auction do not affect the identified and set value.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
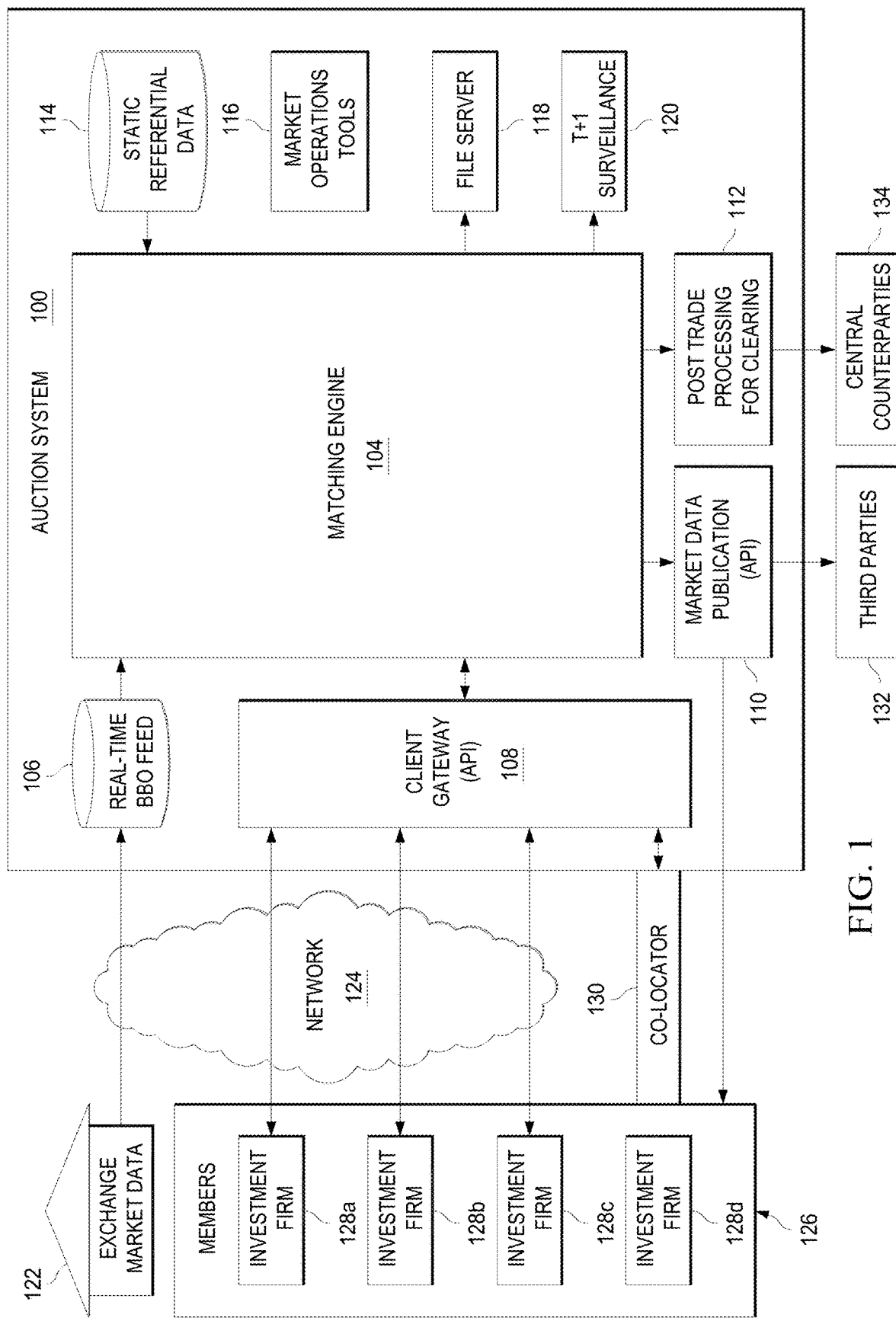
FIG. 1 illustrates a system-level architecture that supports prevention of manipulation in electronic intraday auctions according to an embodiment of this disclosure.

FIGS. 1 to 13, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, intraday auctions refer to auctions that are conducted for financial instruments during normal trading hours for those financial instruments on an electronic trading system. An electronic trading system provides a central market place where both buyers and sellers can buy/sell financial instruments. Traders connect to the electronic trading system via their own trading computers, which can receive market data from the electronic trading system, and which can issue commands to buy or sell specific financial instruments. The issuance of commands to buy or sell financial instruments from a trading computer to the electronic trading system is called electronic trading. Because the function of electronic trading systems is to facilitate the market for various financial instruments, the electronic trading systems are sometimes called electronic markets or electronic exchanges.

When auctions last throughout the day, pricing algorithms used to identify prices for the financial instruments being auctioned can become subject to manipulation. For example, if an intraday auction involves a specific asset that is also listed on a stock exchange, pricing algorithms could use the price for the asset on the stock exchange when identifying a market price for the asset in the intraday auction. If someone were to temporarily manipulate the price for the asset on the stock exchange (even for a few milliseconds), this could cause the pricing algorithms to identify an incorrect market price for the asset in the intraday auction. An asset may be an example of a security or other financial instrument.

This disclosure provides systems and methods for prevention of manipulation in electronic intraday auctions when using an electronic trading system. Among other things, the systems and methods set the price for an intraday auction before the auction begins based on orders for the financial instrument involved in the intraday auction. The systems and methods also provide a price stabilization process that uses both look-back and look-forward periods to avoid temporary price manipulations. In general, the approach operates in three phases. In the "pre-auction" phase, the auction price is set based on initial orders involving a financial instrument and an "order cross" within the orders, and the look-back and look-forward periods are used. In the "auction call" phase, additional buy and sell orders for the financial instrument can be received. In the "uncross" phase, the auction uncrosses, and actual trades for the financial instrument can be initiated. These approaches help to ensure that an auction price for an intraday auction starts and remains within a best bid and best offer spread (BBO) from a liquid market. If the BBO moves during the auction so that the auction price is no longer within the BBO at the time that the auction uncrosses, the auction can be cancelled. These approaches can also be extended and used with conditional offers in the intraday auction.

FIG. 1 illustrates a system-level architecture 100 that supports prevention of manipulation in electronic intraday auctions using an electronic trading system according to an embodiment of this disclosure. Any other suitable computing platform could be used to support price discovery and price stabilization in electronic intraday auctions.

In FIG. 1 the electronic trading system 102 could be implemented in any suitable manner. For example, in some embodiments, the electronic trading system 102 could be implemented using one or more servers or other computing devices. The individual functions of the electronic trading system 102 could be implemented using software or firmware instructions executed by one or more processors of the servers or other computing devices. Network 124 could denote any suitable network or combination of networks. In some embodiments, the network 124 in the system-level architecture 100 denotes a private network that is designed to minimize latency of transmitted data. In some embodiments, electronic trading system 102 includes matching engine 104, real-time BBO feed 106, client gateway 108, market data publication 110, post trade processing system 112 for clearing, static referential data 114, market operations tools 116, file server 118, and T+1 surveillance 120.

The matching engine 104 can be a set of instructions that, when executed by a processor of system 100, processes all order messages through an auction process and executes the trades. Different embodiments of the auction process as executed by the matching engine 104 are described herein in FIGS. 3-10.

The matching engine 104 provides a randomized auction to run as a single order book alongside other order books (the books can run independently with no interaction). Running multiple order books provides the ability to manage members 126 access separately between the auction pool and the other order books. For example, there may be two order books which operate independently of each other, a non-displayed liquidity pool and a displayed liquidity pool. The system 100 provides that an auction price will be within the Primary Best Bid or Offer ("PBBO") and driven from the most passive orders eligible to cross at the point of price determination.

The non-displayed liquidity pool includes orders to be submitted for execution/crossing at either the midpoint of the PBBO reference prices; the Primary Best Bid; or the Primary Best Offer (PBBO Formation and Crossing)). This will enable the Operator to rely on the reference price waiver under the market in Financial Instruments Directive ("MiFID"), permitting operation of the system 100 as a non-displayed liquidity pool on which orders are not subject to pre-trade transparency. The displayed liquidity pool functions as a periodic auction order book, with submitted orders triggering periodic auctions. For each auction, the uncross price and volume will be published in compliance with the MiFID transparency requirements. In one embodiment, there may be no reliance on any transparency waivers.

In an embodiment, the real-time BBO feed 106 receives exchange market data 122 from reference markets through network 124 and provides the market data 122 to the matching engine 104. The market data 122 could include BBO prices and quantities. The feed 106 can be a real-time feed via the network 124, which may be low latency. This market data 122 is used to create a "price band". Market data 122 is price and trade-related data for a financial instrument reported by a trading venue such as a stock exchange. Market data 122 allows traders and investors to know the latest price and see historical trends for instruments such as equities, fixed-income products, derivatives and currencies. The market data 122 is passed to matching engine 104.

Members 126 includes investment firms 128$a$-$d$ that are investment firms who are members of the trading venue. Each investment firm 128$a$-$d$ has one or more computer systems that are operable on the electronic trading platform of the trading venue. The trading venue can include the system 100. Members 126 connect their trading systems to system 100 via a client gateway 108. Client gateway 108 can include an application programming interface (API) that allows applications at the investment firms 128 to communicate with the system 100. In one embodiment, the gateway 108 connection utilizes a low latency network, such as network 124. In this embodiment, the investment firm 128$d$ locates its trading systems in the same location as the system 100. Because network 124 is not used, the time taken to access system 100 is reduced. The client gateway 108 interacts and provides trading requests to matching engine 104.

The matching engine 104 can access different databases to retrieve data for use in the auction process. One internal database can be used to store static referential data 114. The static referential data 114 consists of (but not limited to) trading member configurations and the trading instrument universe. The static referential data 114 can be provided to the matching engine on a periodic basis. The market operations tools include a set of tools for monitoring and maintaining the system 100 (trading venue). These tools monitor and control all components of the system 100.

File server 118 is used for data record keeping and reporting. The data can include trade data performed through the matching engine 104. T+1 surveillance 120 can be a connection to another system that performs market abuse monitoring by collecting information from the matching engine 104. T+1 surveillance 120 supports visibility monitoring purposes of all orders entered into the auction book even if they were ineligible or the auction is cancelled.

The post trade processing system 112 takes a real-time feed from the matching engine and distributes all completed trades for post trade processing. The completed trades can be (but not always) sent to central counterparties 134.

Market data publication 110 can include a real time API to publish system market data to third parties 132. The system market data consists of (but not limited to) completed trades, prices and volumes published in the auction processing. There may be timestamp monitoring of Indicative Matching Price/Volume (IMV/IMP) messages via the market data publication 110. This could be included in the SLA and appropriate for pre-trade market data messages. Performance monitoring in production for the auction could be separate from the other order books.

During the auction process, orders are validated at point of entry for conformance to criteria such as tick size, order size, order consideration, fat finger controls and member permission. Orders are monitored in real-time to identify a Potential Match identified within the PBBO.

The Indicative Matching Price (IMP) is determined and fixed. A price stabilization check is applied to ensure no BBO change occurred X milliseconds prior to the potential match and no there is no further BBO change Y milliseconds after the potential match. If price stabilization check succeeds, the auction call starts.

Indicative matching price (IMP) and indicative matching volume (IMV) are published at the start of the auction call. Once the auction call starts, the IMP is fixed. New orders and specific amendments do not affect the IMP, are permitted during the auction call and an updated IMV is published. The length of the auction call can be randomized with configurable minimum and maximum time parameters.

At the end of the auction call, if the IMP is still within the BBO, the auction uncross starts. Timestamps on trade acknowledgment messages sent to members could have microsecond granularity and be MiFID II compliant. Only one trade for the full volume may be published via the market data publisher. Trade sides will be sent to the CCPs.

Note that while the system-level architectures are described as using the SIGMA X MTF platform from GOLDMAN, SACHS & CO., this is for illustration only. Any other suitable computing platform could be used to support price discovery and price stabilization in electronic intraday auctions. The auction pool can share the same instrument universe as SIGMA X MTF. The auction pool can use all the same halting logic that is used in SIGMA X MTF. An auction could be cancelled if an instrument goes into a halted state at any time during the auction process.

In one or more embodiments, the system 100 includes the ability to download the auction book history for an instrument from the file server 118 using the operations tools 116. The history could show the lifecycle of an auction for an instrument and identify which orders were involved. The system 100 also includes the ability to filter trades between auction and/or other orderbooks. The system 100 provides for an orderbook that uses separate tab for the auction and other orderbooks, visibility of all pre-order validation settings, the ability to manage each of the members 126 permissions to the order books, and end of day report for auction orderbook history in using market data publication 110.

Some organizations undertake trading or entering orders to trade in one trading venue or outside a trading venue with the intention of improperly influencing the value of a financial instrument in another trading venue. These organizations also take advantage of high speed infrastructure or locate trading servers as close as possible to servers of a trading venue to improve the speed at which the market data is received and the speed at which an electronic trading platform can interact with the venue. A co-location is when the trading servers are located in the same warehouse as an electronic trading platform. Organizations can also use software to review multiple price feeds for financial instruments at the same time. When using low latency architecture, price updates can be detected in one venue and that are not yet reflected in a second trading venue. This delay in the second trading venue can allow the organization to execute a trade in the second trading venue taking advantage of the knowledge of the upcoming price update.

Different embodiments of this disclosure recognize and consider that in electronic trading systems where trading is performed using trading computers connected to the electronic trading system, the opportunity exists to manipulate an auction on the electronic trading system using millisecond or sub-millisecond connections to the electronic trading system. That is, the duration of the auction may exist longer than the speed at which the trading computers can submit additional trades to manipulate the auction. To overcome this technical issue with electronic auctions, the embodiments herein provide the ability to fix a price of an auction and prevent manipulation from such attacks.

Figures 2, 3:
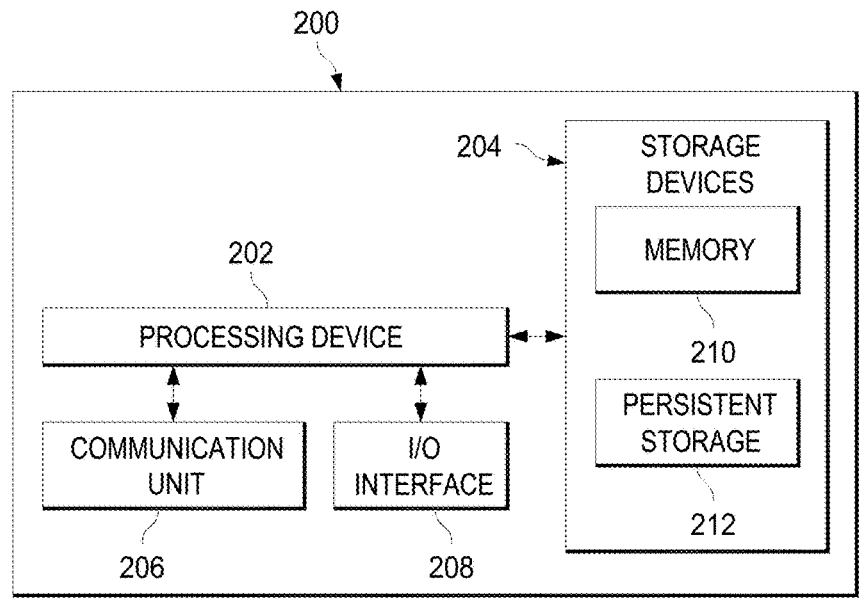
FIG. 2 illustrates an example device for prevention of manipulation in electronic intraday auctions according to this disclosure.
FIG. 3 illustrates an orderbook according to an embodiment of this disclosure.

FIG. 2 illustrates an example device 200 for prevention of manipulation stabilization in electronic intraday auctions according to this disclosure. The device 200 could, for example, denote the computing device or one of the computing devices that implement the auction system in the system-level architectures of FIG. 1.

As shown in FIG. 2, the device 200 includes at least one processing device 202, at least one storage device 204, at least one communications unit 206, and at least one input/output (I/O) unit 208. The processing device 202 executes instructions that may be loaded into a memory 210. In some embodiments, the instructions executed by the processing device 202 could include instructions that implement the matching engine and other functions or components of the auction system. The processing device 202 includes any suitable number(s) and type(s) of processors or other devices in any suitable arrangement. Example types of processing devices 202 include microprocessors, microcontrollers, digital signal processors, field programmable gate arrays, application specific integrated circuits, and discrete circuitry.

The memory device 210 and a persistent storage 212 are examples of storage devices 204, which represent any structure(s) capable of storing and facilitating retrieval of information (such as data, program code, and/or other suitable information on a temporary or permanent basis). The memory device 210 may represent a random-access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

Although FIG. 2 illustrates one example of a device 200 for price discovery and price stabilization in electronic intraday auctions, various changes may be made to FIG. 2. For example, computing devices come in a wide variety of configurations, and FIG. 2 does not limit this disclosure to any particular computing device.

FIG. 3 illustrates an orderbook 300 according to an embodiment of this disclosure. The orderbook 300 can be used by a processor implementing matching engine 104 as shown in system 100 of FIG. 1.

The auction price is determined at the beginning of the auction based on the orders in the orderbook at that time. During the auction call phase, the price is fixed. For price determination orders are prioritized based on price, broker priority, size, and/or time. The broker priority can be enabled at the order entry level. If not flagged on the order, the prioritization will be based on price, size, time. The matching engine selects a price point that will maximize executable quantity. If more than one price point exists, the matching engine selects the price that falls exactly half way between the most passive orders (lowest buyer+highest seller) included in the executable quantity.

Any orders that are submitted after the auction call phase is opened will not contribute to the price discovery since the price is fixed. Those orders will benefit from time prioritization only.

In FIG. 3, the orderbook 300 is provided vertically to illustrate the crossed orders. The orderbook 300 includes a bid 302, limit price 304, ask 306, and executable quantity 308. Section 310 represents the BBO prices. The executable quantity 308 is shown at each of the respective price points.

In this example, the orders include O1 that is a buy of 25 shares at a price of 9, O2 that is a buy of 100 shares at 9.5 O3 that is a buy of 75 shares at 10, and O4 that is a sell of 200 shares at 8. When following the prioritization logic, to maximize quantity, a price point of 8, 8.5 or 9 (the prices between the lowest buyer and highest seller) should be selected. Since there are multiple price points available, to maximize quantity, the price that falls exactly half way between the most passive orders on each side of the book (O1 and O4) is selected, thus the price=8.5.

Order types can include a PBBO Bid with or without limit, a PBBO Mid with or without limit, a PBBO Ask with or without limit, and a limit (where a Limit order is entered, an aggressive Peg is automatically applied to ensure it stays within the PBBO should the limit be/become too aggressive)

Examples of order types can include:

PBBO is 11-12. Buy Limit order at 13. Notional Price is 12;

PBBO is 11-12. Buy Limit order at 12. Notional price is 12. If PBBO changes to 10-11, Notional Price is automatically updated to 11; and PBBO is 11-12. Buy Limit order at 11. Notional Price is 11. PBBO changes to 12-13. Notional Price remains 11.

Figure 4:
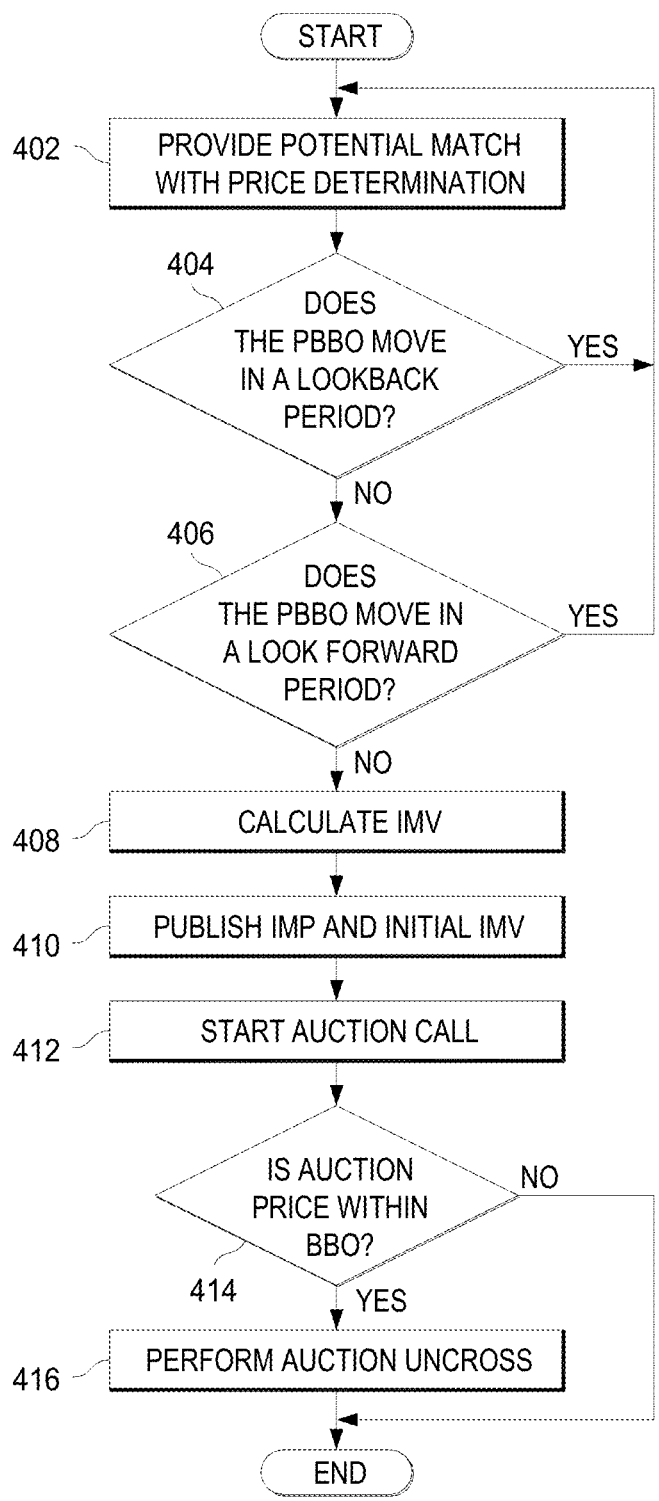
FIG. 4 illustrates an auction flow according to an embodiment of this disclosure.

FIG. 4 illustrates an auction flow according to an embodiment of this disclosure. The auction flow can be performed by a processor implementing matching engine 104 as shown in system 100 of FIG. 1.

At step 402, the engine 104 provides a potential match with price determination. The matching engine 104 monitors all orders in real-time using notional price, broker, size, and time criteria to identify a potential match within the BBO. Order parameters such as self-cross prevention and minimum quantity (MAQ) can be considered when finding a potential match. A potential match can occur through new order entry, order amendment, an unhalt of a stock, or a change in the BBO.

Price determination establishes the IMP that maximizes crossing opportunities and offer price improvement to both buyers and sellers. The IMP is calculated as the midpoint between the executable buy order and executable sell order. An executable order is an order that will match in a single uncrossing when all orders have been prioritized and order characteristics such as MAQ, self-cross prevention and broker prioritization have been considered.

Where multiple orders with more than one price point (that could achieve the highest executable quantity) are used to form the potential match, the IMP is calculated as the midpoint between the lowest priced executable buy and the highest priced executable sell of those orders. Only orders within the current BBO are considered, i.e. orders that are too passive are not considered. Orders cannot be too aggressive as an aggressive peg may be applied where no peg type is entered.

In various embodiments, MAQ reallocation logic can be applied to ensure the quantity crossed is maximized. The IMP can be as granular as a quarter tick. Where the IMP is more granular than a quarter tick (due to the contributing orders straddling two tick scale IDs), the IMP could be rounded down to the next valid quarter tick. Classes can be adjusted accordingly to accommodate the required decimal place setting. The mathematical rounding used today for trade prices that are greater than the decimal places available can be used for IMP calculation. For example, if the bid order is 100.0003 and the ask order is 100.0000, the resulting five decimal place IMP of 100.00015 will be rounded down to 100.0001. A class is a subset of the SIGMA X MTF instrument platforms. These subjects are defined per underlying primary exchange. For example, all of the instruments that have the Swiss stock exchange as a primary venue can be gathered in one class.

If an instrument goes into a halted state during step 402, the auction process is stopped and only restarted when the stock is unhalted and a new potential match can be found.

Once a potential match is identified, the matching engine 104 performs a price stabilization check. The PBBO can be consumed from primary market data feeds 106. Under MiFID 2, this may become the "Most Liquid Market" data feed.

In one or more embodiments, there is a minimum period of X+Y milliseconds before the auction call starts where no PBBO changes can have occurred. At step 404, the matching engine 104 reviews a look back period that includes X milliseconds before the potential match timestamp to identify whether the PBBO moved. If yes, the matching engine 104 repeats step 402 and goes back to potential match with new PBBO.

At step 406, the matching engine 104 reviews a look forward period and waits Y milliseconds from the end of the X timer (timestamp of the potential match). If a PBBO change occurs, the matching engine 104 repeats step 402 and goes back to potential match with new PBBO. If there is no further PBBO changes on the instrument, the matching engine 104 progresses to the auction trigger.

The values X+Y can be configured at a class level. These values could be visible in the operational tools within a classes tab.

During step 406, new orders can be accepted and the notional price, broker, size, and time criteria can be rerun. If a new order affects the IMP, the auction procedure restarts at step 402. If there is no impact to IMP, step 406 continues even though the IMV will be updated.

Amendments can be accepted and the Notional Price/Broker/Size/Time matching algorithm can be rerun. If an amendment affects the IMP, the Auction procedure restarts at Step 402. If there is no impact to IMP, even if the IMV changes, step 406 continues. Amendments may result in a new timestamp.

If an instrument goes into a halted state during price stabilization, the auction process is stopped and is only restarted at step 402 when the stock is unhalted and a new potential match can be found.

At step 408, the matching engine 104 calculates the IMV using notional price, broker, size, and time criteria. Only orders with a notional price within the current PBBO may be considered. MAQ reallocation logic can be applied to ensure the quantity crossed is maximized. If the PBBO has moved since the IMP was created and the IMP is now outside the PBBO, the auction procedure restarts.

At step 410, the matching engine 104 publishes the IMP and initial IMV via a market data message. Once the IMP and initial IMV are published, at step 412, the matching engine 104 starts the auction call. If there are no orders already sitting in the orderbook, nor any orders entered during the auction call, the auction can be terminated.

During the auction call, the following amendments types are permitted: increase in volume, amend the price to be more aggressive, amend the MAQ down. Amendments can result in a new Timestamp. New orders are permitted.

Cancellations received once the auction call has started may be rejected. The following exceptions to this rule could apply, a cancel on disconnect may continue to work and a cancel by the operations team may continue to work. If orders are canceled due to cancel on disconnect or by the operations team, the matching engine 104 may continue with the auction unless IMV=0. If IMV=0, the matching engine 104 may cancel the auction. The IMP does not change once it has been published.

The process used to allocate volume once the auction call phase has started includes applying notional price, broker, size, and time priority criteria for orders received prior to the auction call; a time priority for orders received or amended during the auction call; order parameters such as self-cross prevention, IMS, broker prioritization and MAQ are considered when allocating volume; and MAQ reallocation logic can be applied to ensure the quantity crossed is maximized.

IMV can be updated via a market data message in real-time to reflect new or amended orders. The PBBO may not be considered when calculating the IMV during the auction call.

The duration of the auction call can be randomized with a system-level setting to determine the minimum and maximum duration in milliseconds. An auction call cannot begin if the IMP is less than or equal to zero or the IMV is less than or equal to zero.

If an instrument goes into a halted state (for any reason) during the auction call, the auction process is stopped and is only restarted at step 402 when the stock is unhalted and a new potential match can be found. IMP=0 and IMV=0 may be published via market data.

At step 414, the matching engine 104 determines whether the auction price is within the BBO. The IMP is used as the auction price. Step 414 may occur after a predetermined amount of time. If not, the auction is terminated. If yes, at step 416, the matching engine performs an auction uncross.

In various embodiments notional price, broker, size, and time criteria priority is applied to orders with a timestamp prior to the auction call and time priority for orders received/amended during the auction call. Order parameters such as self-cross prevention, IMS, broker prioritization and MAQ can be considered when allocating volume. MAQ reallocation logic can be applied to ensure the quantity crossed is maximized.

Whether the Auction takes place or is cancelled, any unfilled or partially filled Good for Auction (GFA) Orders are cancelled back. Any unfilled or partially filled GFD orders remain on the order book until the next auction or until cancelled.

Trades for each execution can be sent to a clearing house and can be MiFID2 compliant. In one example, there can be no change of market identifier code (MIC) on messages to the clearing house. MIC is a unique identification code used to identify securities trading exchanges, regulated, and non-regulated trading markets. Trade messages to the members can be microsecond granularity and MiFID II compliant. Trade messages via the market data publisher can contain the MIC for the auction. Only one trade for the full auction volume may be published via the market data publisher. At the end of an auction, whether completed or cancelled, IMP=0 and IMV=0 could be published via market data.

These functions are described in conjunction with the system 100. However, the functions described in FIG. 4 could be used in any other suitable system. Also note that the functionality of the system 100 could be changed to include other or additional functionality.

FIGS. 5-13 illustrate various time series diagrams.

Figure 5:
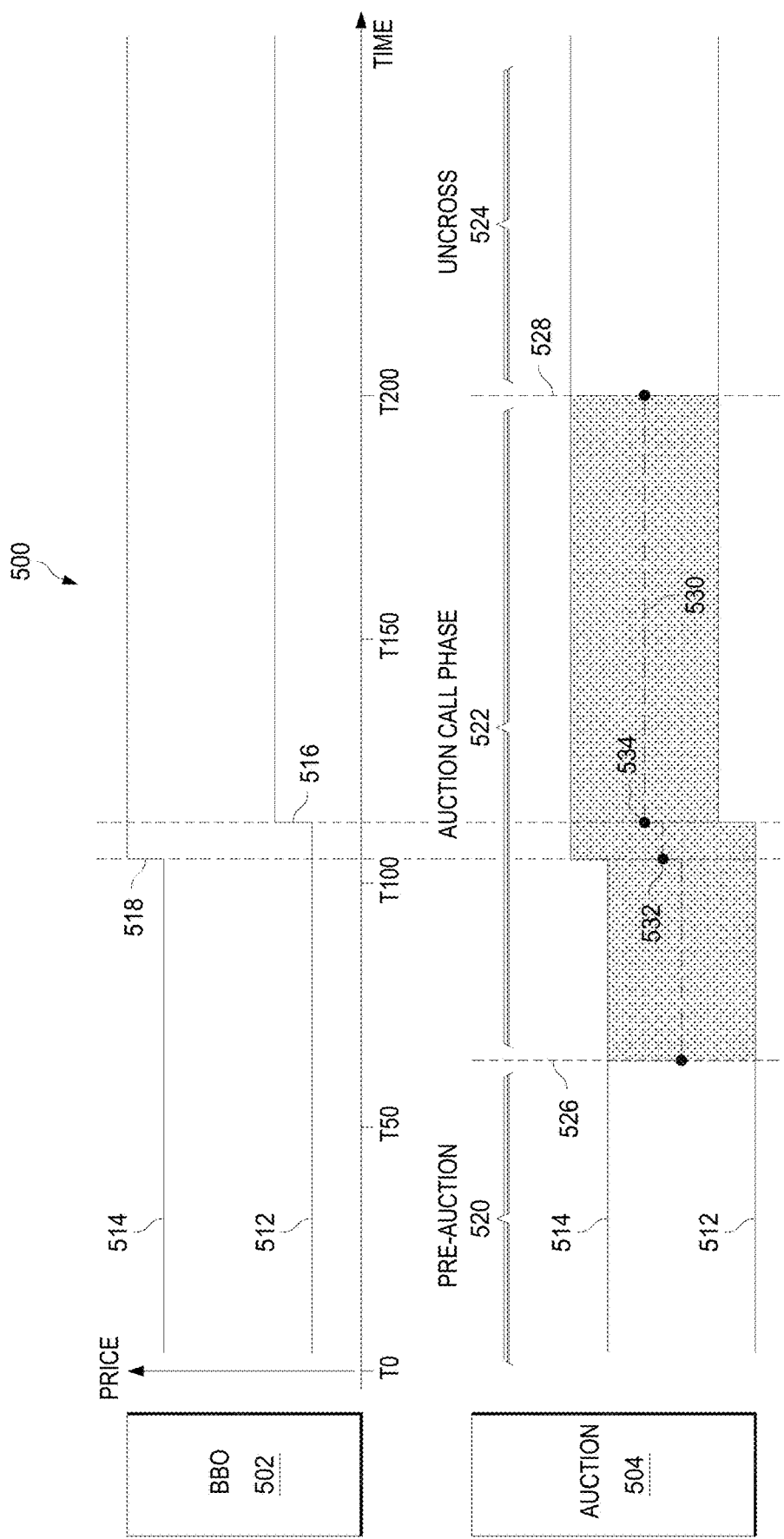
FIG. 5 illustrates a time series diagram with peg orders only.

FIG. 5 illustrates a time series diagram 500 with peg orders only. The actions in the time series diagram 500 can be performed by a processor implementing matching engine 104 as shown in system 100 of FIG. 1.

Time series diagram 500 includes an BBO timeline 502 and an auction timeline 504. During the timelines 502 and 504, orders can be placed and market data may change. Time series diagram 500 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 11, and at time 518 the bid price changes to 11.2 and at time 516 the offer price changes to 10.2.

The auction timeline 504 includes a pre-auction phase 520, an auction call phase 522, and an uncross phase 524.

The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 530. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 5, during the pre-auction phase 520, a midpoint peg order of "Buy 50 at mid" is entered. The auction price 530 and volume are both zero at this time. When a sell order of "Sell 60 at mid" is received, the orders cross to create order crossing 526. According to the BBO timeline 502, the auction price 530 is 10.5, with a volume of 60.

At time 518, the auction price 530 changes to 10.6, and at time 516, the auction price 530 changes to 10.7. Because of the BBO band changes, the market data can be manipulated on the reference market during the auction call phase 522 affecting the bid/mid/offer prices on peg orders in the auction. In this example, the trade would occur at the order uncrossing 528, where a trade of 60 shares at 10.7 occurs. Embodiments of this disclosure recognize and consider that changes in the BBO can create unfavorable price movements. Orders can be cancelled during the auction call phase 522 when prices change, which adversely affects other members in the auction.

Figure 6:
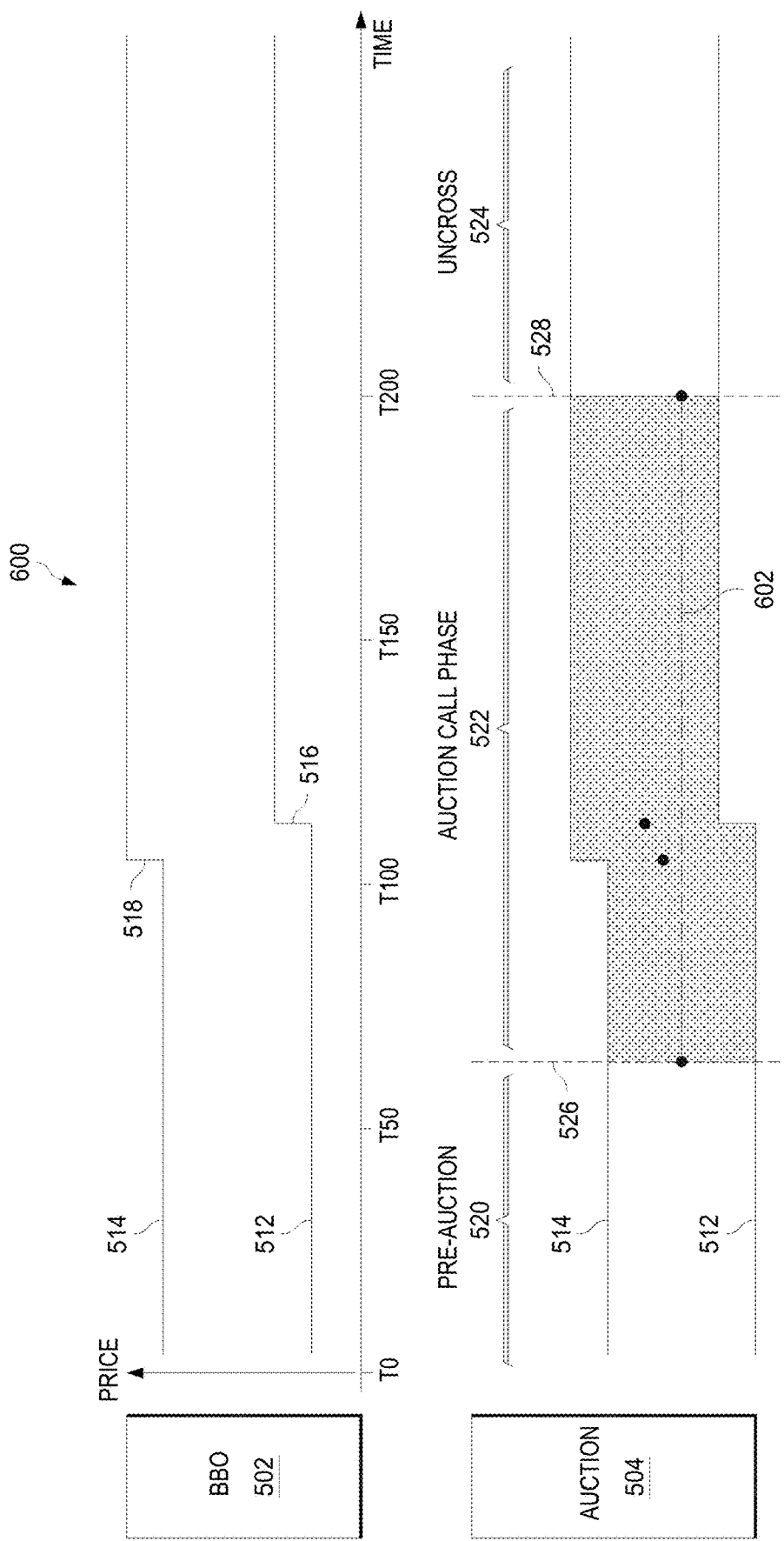
FIG. 6 illustrates a time series diagram, with peg orders only, according to an embodiment of this disclosure.

FIG. 6 illustrates a time series diagram 600, with peg orders only, according to an embodiment of this disclosure. The actions in the time series diagram 600 can be performed by a processor implementing matching engine 104 as shown in system 100 of FIG. 1. Compared to time series diagram 600 of FIG. 5, the auction price 602 is determined at the time the auction is opened and fixed throughout the auction Time series diagram 600 includes an BBO timeline 502 and an auction timeline 504. During the timelines 502 and 504, orders can be placed and market data may change. Time series diagram 600 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 11, and at time 518 the bid price changes to 11.2 and at time 516 the offer price changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 602. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 6, during the pre-auction phase 520, a midpoint peg order of "Buy 50 at mid" is entered. The auction price 602 and volume are both zero at this time. When a sell order of "Sell 60 at mid" is received, the orders cross to create order crossing 526. According to the BBO timeline 502, the auction price 602 is 10.5, with a volume of 60.

At times 518 and 516, even though the BBO changes, the auction price 602 remains fixed at 10.5. In this example, the trade would occur at the order uncrossing 528, where a trade of 60 shares at 10.5 occurs. Here, BBO band changes during the call phase do not affect the auction price 602, which prevents BBO price band manipulation opportunities. In one example embodiment, if the auction price 602 is outside the BBO at the order uncross 528, the auction is cancelled. Orders may not be cancelled during the call phase.

Figure 7:
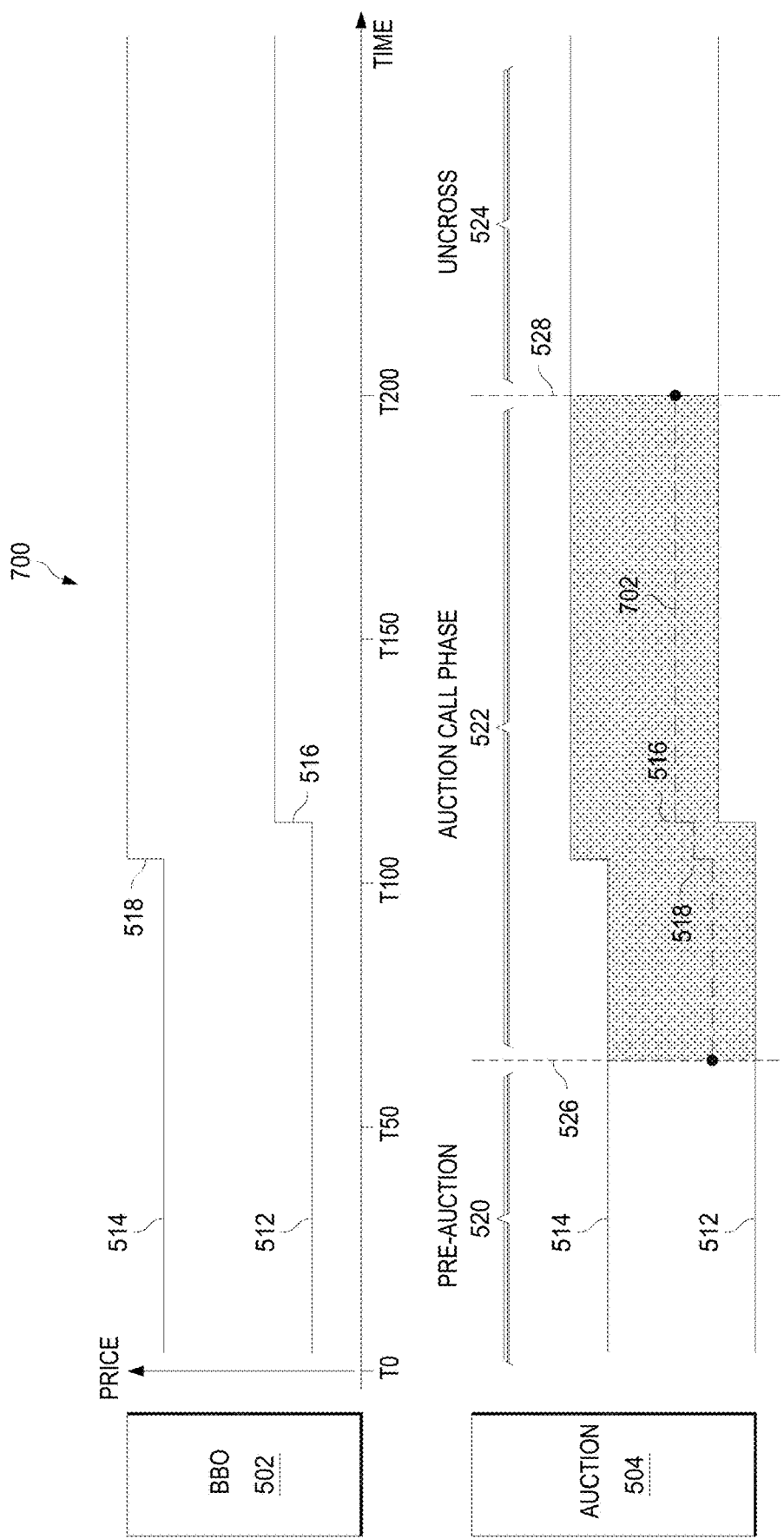
FIG. 7 illustrates a time series diagram with peg and limit orders.

FIG. 7 illustrates a time series diagram 700 with peg and limit orders. The actions in the time series diagram 700 can be performed by a processor implementing matching engine 104 as shown in system 100 of FIG. 1.

Time series diagram 700 includes a BBO timeline 502 and an auction timeline 504. During the timelines 502 and 504, orders can be placed and market data may change. Time series diagram 700 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 11, and at time 518 the bid price changes to 11.2 and at time 516 the offer price changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 702. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 7, during the pre-auction phase 520, a midpoint peg order of "Buy 52 at mid" is entered. The auction price 702 and volume are both zero at this time. When a sell order of "Sell 45 at limit=10" is received, the orders cross to create order crossing 526. According to the BBO timeline 502, the auction price 702 is 10.25, with a volume of 45.

At time 518, the auction price 702 changes to 10.3, and at time 516, the auction price 702 changes to 10.35. Because of the BBO band changes, the market data can be manipulated on the reference market during the auction call phase 522 affecting the bid/mid/offer prices on peg orders in the auction. In this example, the trade would occur at the order uncrossing 528, where a trade of 45 shares at 10.35 occurs. Embodiments of this disclosure recognize and consider that changes in the BBO can create unfavorable price movements. Orders can be cancelled during the auction call phase 522 when prices change, which adversely affects other members in the auction.

Figure 8:
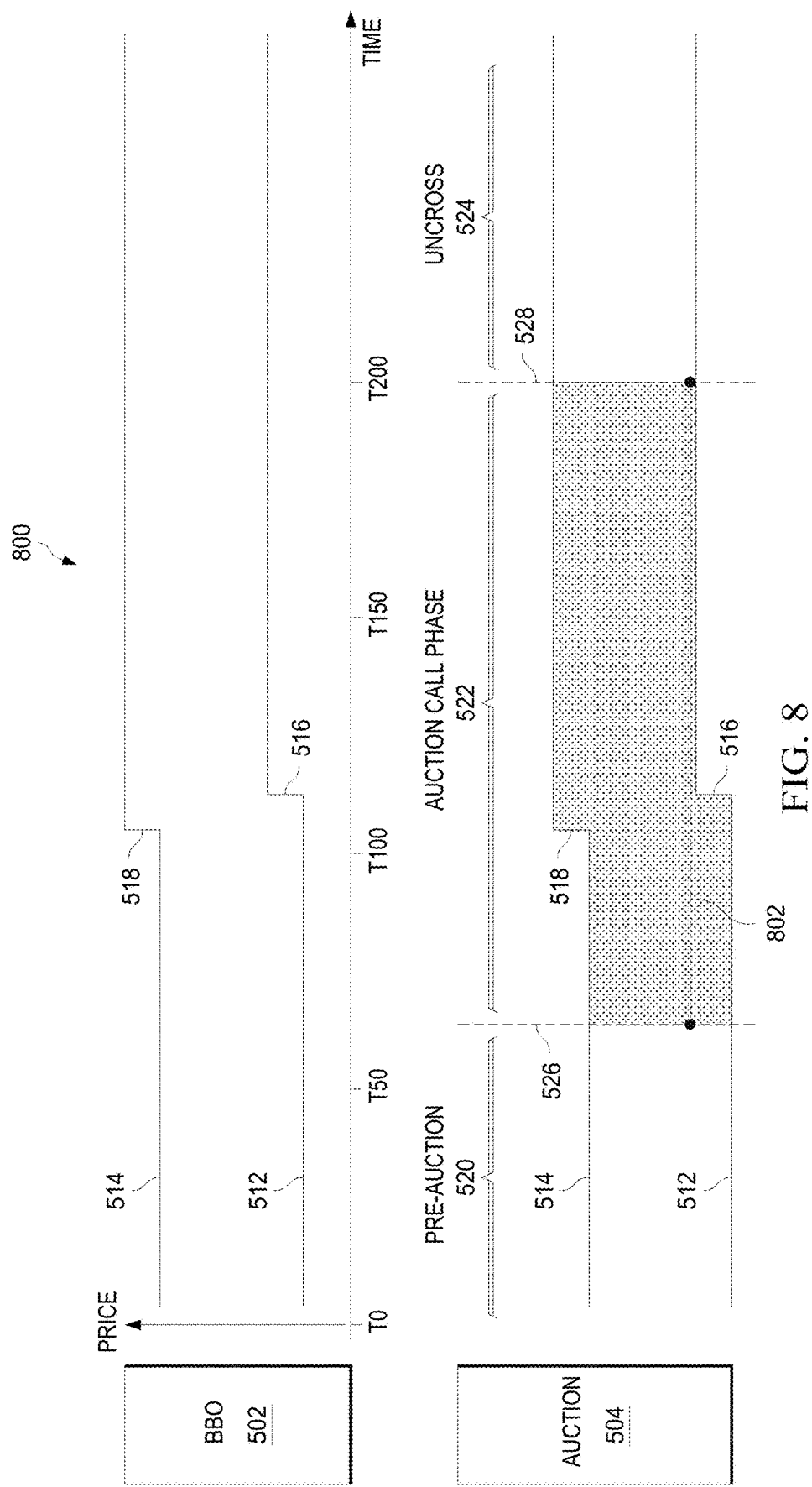
FIG. 8 illustrates a time series diagram with peg and limit orders, according to an embodiment of this disclosure.

FIG. 8 illustrates a time series diagram 800 with peg and limit orders, according to an embodiment of this disclosure. The actions in the time series diagram 800 can be performed by a processor implementing matching engine 104 as shown in system 100 of FIG. 1. Compared to time series diagram 700 of FIG. 7, the auction price 802 is determined at the time the auction is opened and fixed throughout the auction Time series diagram 800 includes an BBO timeline 502 and an auction timeline 504. During the timelines 502 and 504, orders can be placed and market data may change. Time series diagram 800 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 11, and at time 518 the bid price changes to 11.2 and at time 516 the offer price changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 702. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 8, during the pre-auction phase 520, a midpoint peg order of "Buy 52 at mid" is entered. The auction price 802 and volume are both zero at this time. When a sell order of "Sell 45 at limit=10" is received, the orders cross to create order crossing 526. According to the BBO timeline 502, the auction price 802 is 10.25, with a volume of 45.

At times 518 and 516, even though the BBO changes, the auction price 802 remains fixed at 10.25. In this example, the trade would occur at the order uncrossing 528, where a trade of 60 shares at 10.5 occurs. Here, BBO band changes during the call phase do not affect the auction price 802, which prevents BBO price band manipulation opportunities. In one example embodiment, if the auction price 802 is outside the BBO at the order uncross 528, the auction is cancelled. Orders may not be cancelled during the call phase.

Figure 9:
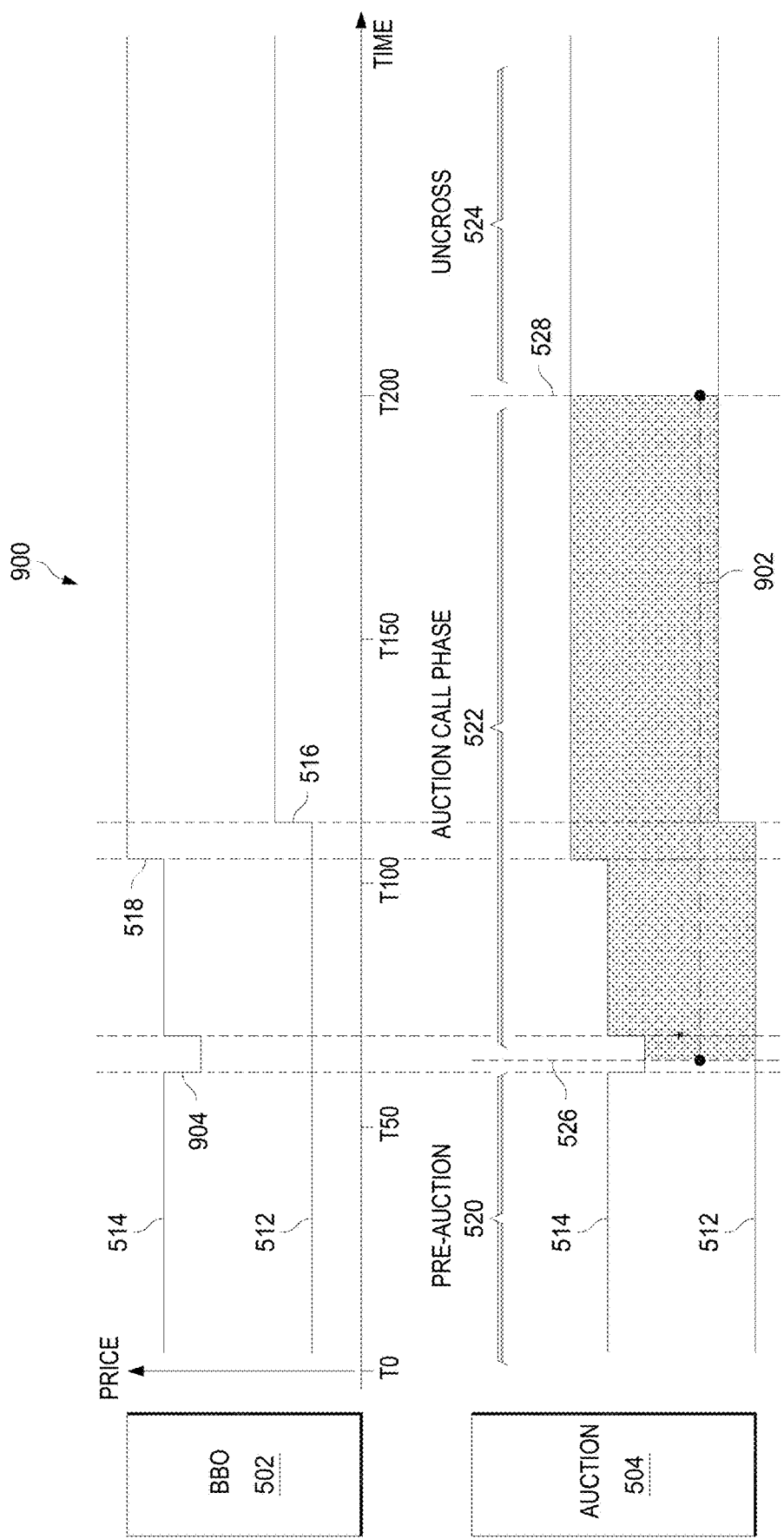
FIG. 9 illustrates a time series diagram with BBO manipulation at price determination.

FIG. 9 illustrates a time series diagram 900 with BBO manipulation at price determination. The actions in the time series diagram 900 can be performed by a processor implementing matching engine 104 as shown in system 100 of FIG. 1.

Time series diagram 900 includes an BBO timeline 502 and an auction timeline 504. During the timelines 502 and 504, orders can be placed and market data may change. Time series diagram 900 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 11, and at time 518 the bid price changes to 11.2 and at time 516 the offer price changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 902. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 9, during the pre-auction phase 520, a midpoint peg order of "Sell 75 at mid" is entered. The auction price 902 and volume are both zero during at this time. When a buy order of "Buy 65 at limit=10.5" is received, the orders cross to create order crossing 526. In this example, at time 904 that occurs during order crossing 526, there is a BBO manipulation where the buy price is at 10.8 (down from 11) for a brief period of time. This period of time could be, for example, less than 10 ms. According to the BBO timeline 502, the auction price 902 is 10.45, with a volume of 65. The auction price 902, would have been 10.5 if not for the temporary price manipulation at time 904.

At times 518 and 516, even though the BBO changes, the auction price 902 remains fixed at 10.45. In this example, the trade would occur at the order uncrossing 528, where a trade of 65 shares at 10.45 occurs. Here, BBO band changes during the call phase do not affect the auction price 902, which prevents BBO price band manipulation opportunities. In one example embodiment, if the auction price 902 is outside the BBO at the order uncross 528, the auction is cancelled. Orders may not be cancelled during the call phase.

Figure 10:
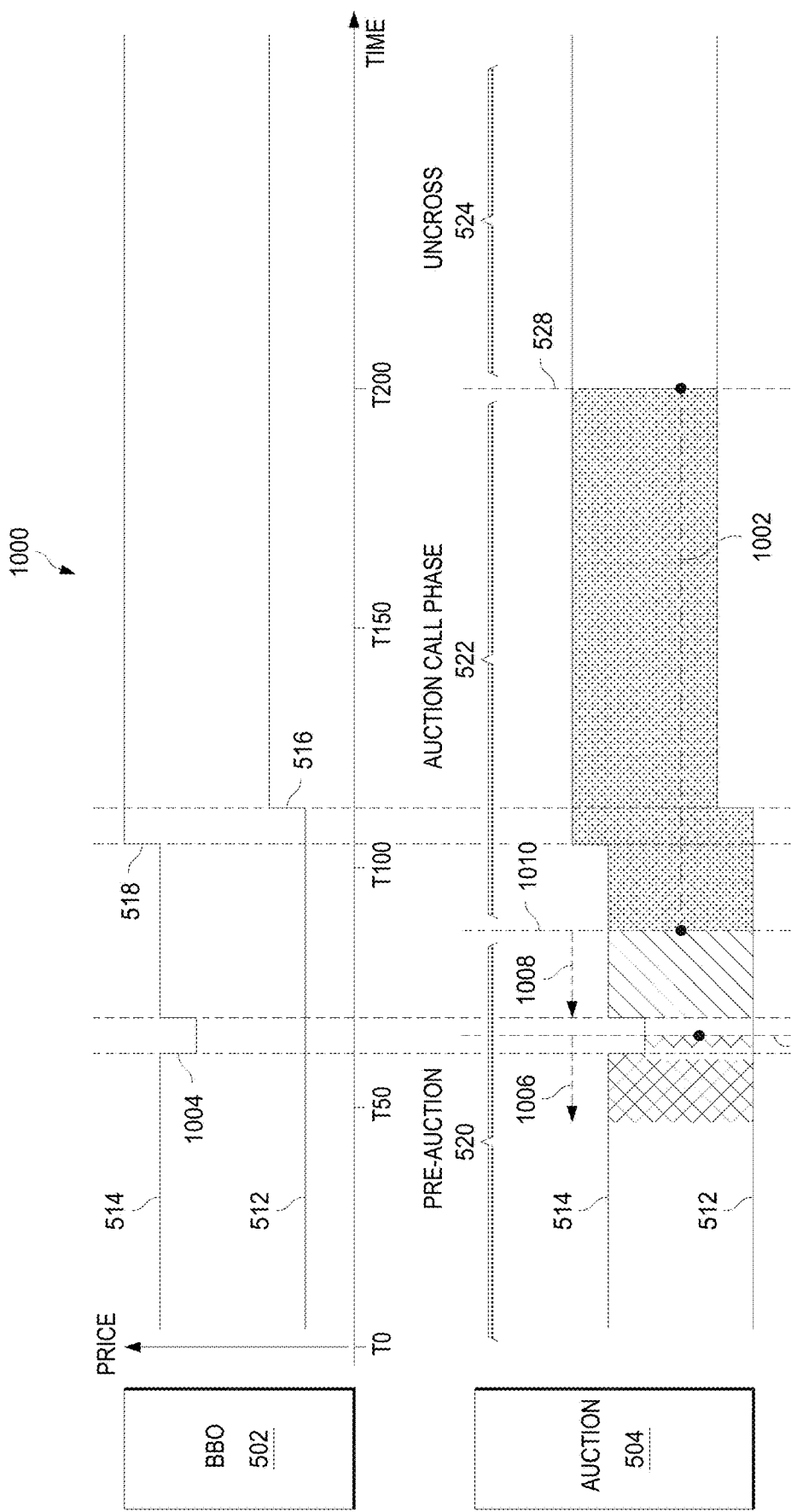
FIG. 10 illustrates a time series diagram with price lookback stabilization according to an embodiment of this disclosure.

FIG. 10 illustrates a time series diagram 1000 with price lookback stabilization according to an embodiment of this disclosure. The actions in the time series diagram 1000 can be performed by a processor implementing matching engine 104 as shown in system 100 of FIG. 1. Compared to time series diagram 900 of FIG. 9, time series diagram 1000 does not allow for price manipulation at an auction start.

Time series diagram 1000 includes an BBO timeline 502 and an auction timeline 504. During the timelines 502 and 504, orders can be placed and market data may change. Time series diagram 1000 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 11, and at time 518 the bid price changes to 11.2 and at time 516 the offer price changes to 10.2.

The auction timeline 504 includes a pre-auction phase 520, an auction call phase 522, and an uncross phase 524. The pre-auction phase 520 is the time prior to auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 902. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 10, during the pre-auction phase 520, a midpoint peg order of "Sell 75 at mid" is entered. The auction price 1002 and volume are both zero during at this time. When a buy order of "Buy 65 at limit=10.5" is received, the orders cross to create order crossing 526. At time 1004, which occurs during order crossing 526, there is a BBO manipulation where the buy price is at 10.8 (down from 11) for a brief period of time. This period of time could be, for example, less than 10 ms. The matching engine performs a lookback of the BBO band to determine whether any changes occurred within a threshold period of time prior to order crossing 526. Because, in the first example, there was the a BBO manipulation at 1004 that occurred within the lookback period, the auction is not started. Rather, the matching engine waits until the threshold period of time elapses without a BBO change. In this example, the auction starts at order crossing 1010 when the conditions are met without a price change. As a result of the lookback, the auction price 1001 is 10.5.

Figure 11:
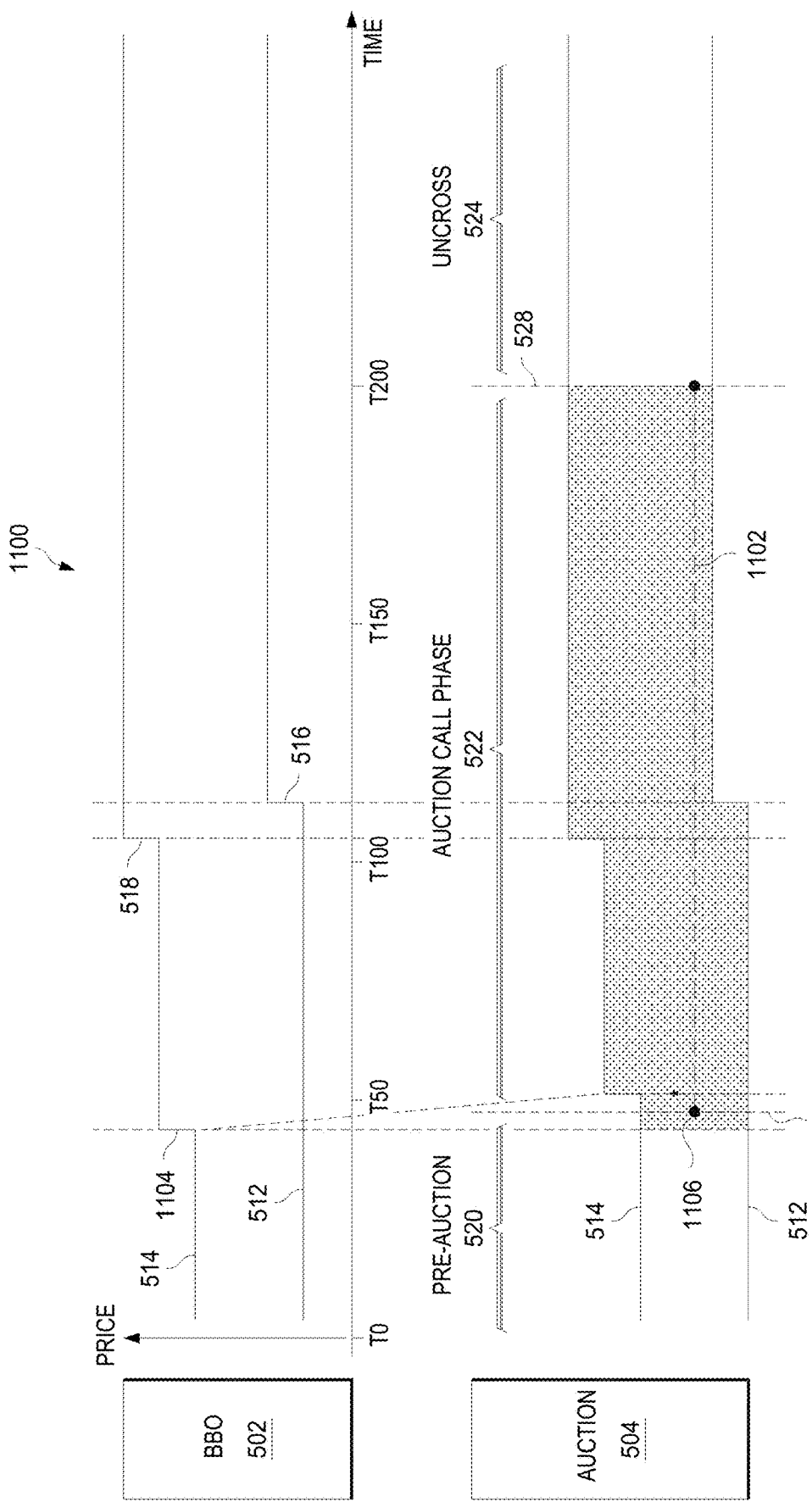
FIG. 11 illustrates a time series diagram with BBO latency at price determination.

At times 518 and 516, even though the BBO changes, the auction price 1002 remains fixed at 10.5. In this example, the trade would occur at the order uncrossing 528, where a trade of 65 shares at 10.5 occurs. Here, BBO band changes during the call phase do not affect the auction price 1002, which prevents further BBO price band manipulation opportunities. In one example embodiment, if the auction price 1002 is outside the BBO at the order uncross 528, the auction is cancelled. Orders may not be cancelled during the call phase FIG. 11 illustrates a time series diagram 1100 with BBO latency at price determination. The actions in the time series diagram 1100 can be performed by a processor implementing matching engine 104 as shown in system 100 of FIG. 1.

Time series diagram 1100 includes an BBO timeline 502 and an auction timeline 504. During the timelines 502 and 504, orders can be placed and market data may change. Time series diagram 1100 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 10.8. At time 515, the offer price 514 changes to 11, at time 518 the offer price 514 changes to 11.2, and at time 516 the bid price 512 changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 902. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 11, during the pre-auction phase 520, a midpoint peg order of "Sell 75 at mid" is entered. The auction price 1102 and volume are both zero during at this time. When a buy order of "Buy 65 at limit=10.5" is received, the orders cross to create order crossing 526. At time 1104, which occurs prior to order crossing 526, there is price change from 10.8 to 11 for the offer price 514. BBO feeds from reference markets to the auction system may have an associated latency. This creates an opportunity for members with more advance technology to exploit the latency. Here, the buyer sees an offer price increase at 1104 on the reference market and submits a buy order before the auction receives the price update at 1106. As a result, the auction is opened at a time and a price which is not representative of what the mid-peg order should be due to the BBO latency. For example, the order crossing 526 occurs when the auction system considers the midpoint to be 10.45, where the midpoint of the BBO is 10.5.

At times 518 and 516, even though the BBO changes, the auction price 1002 remains fixed at 10.45. In this example, the trade would occur at the order uncrossing 528, where a trade of 65 shares at 10.45 occurs. Here, BBO band changes during the call phase do not affect the auction price 1102, which prevents further BBO price band manipulation opportunities. In one example embodiment, if the auction price 1102 is outside the BBO at the order uncross 528, the auction is cancelled. Orders may not be cancelled during the call phase.

Figure 12:
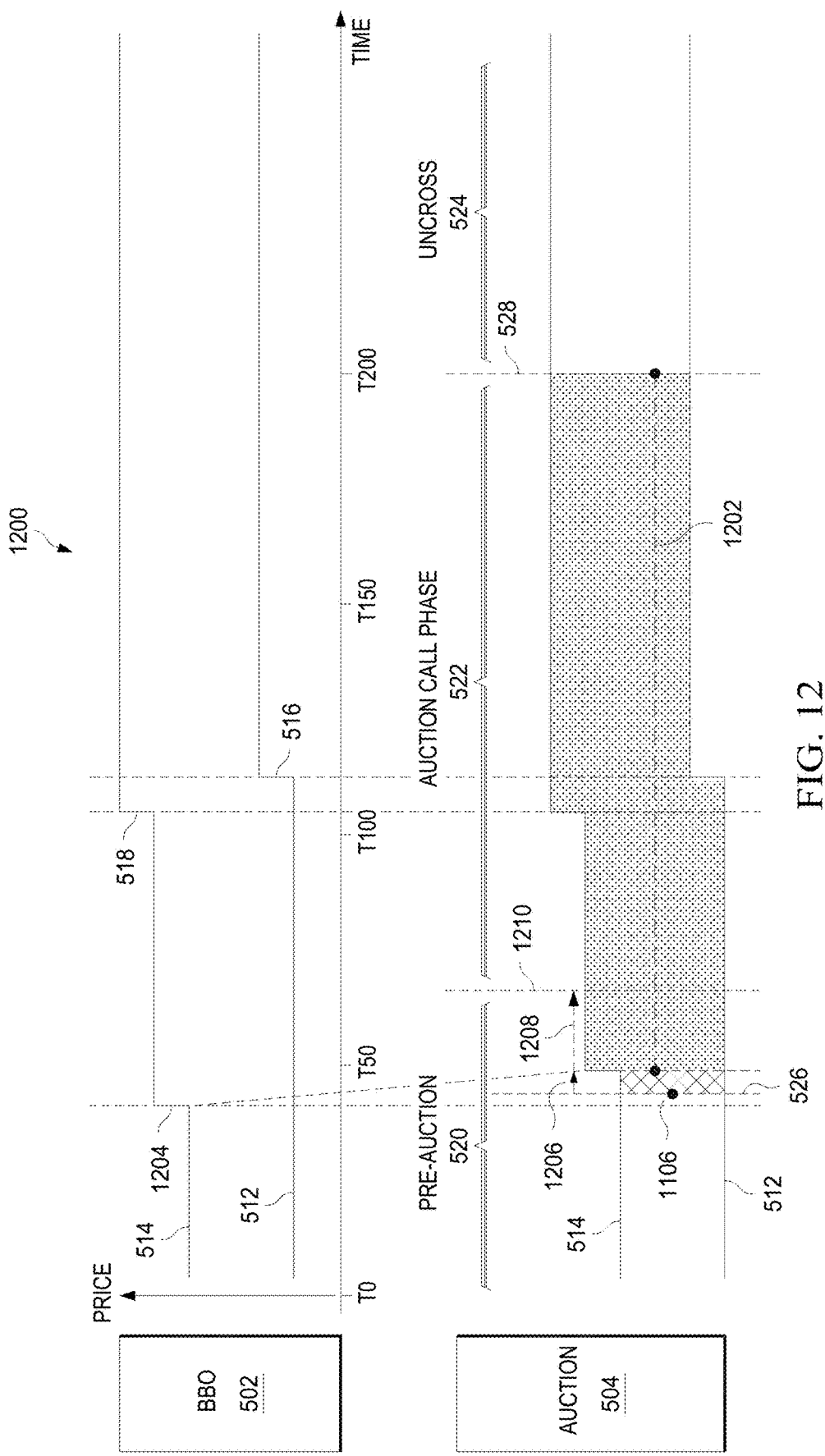
FIG. 12 illustrates a time series diagram with price stabilization look forward according to an embodiment of this disclosure.

FIG. 12 illustrates a time series diagram 1200 with price stabilization look forward according to an embodiment of this disclosure. The actions in the time series diagram 1200 can be performed by a processor implementing matching engine 104 as shown in system 100 of FIG. 1. Compared to time series diagram 1100 of FIG. 11, time series diagram 1200 does not allow for price manipulation due to latency.

Time series diagram 1100 includes an BBO timeline 502 and an auction timeline 504. During the timelines 502 and 504, orders can be placed and market data may change. Time series diagram 1100 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 10.8. At time 515, the offer price 514 changes to 11, at time 518 the offer price 514 changes to 11.2, and at time 516 the bid price 512 changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 902. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 12, during the pre-auction phase 520, a midpoint peg order of "Sell 75 at mid" is entered. The auction price 1102 and volume are both zero during at this time. When a buy order of "Buy 65 at limit=10.5" is received, the orders cross to create order crossing 526. At time 1104, which occurs prior to order crossing 526, there is price change from 10.8 to 11 for the offer price 514. BBO feeds from reference markets to the auction system may have an associated latency. This creates an opportunity for members with more advance technology to exploit the latency. Here, the buyer sees an offer price increase at 1204 on the reference market and submits a buy order before the auction receives the price update at 1206. In this embodiment, the auction will not begin if the BBO band moves within a specified period of time after the orders crossing 526. That is, the matching engine will not set the auction price 1202 until the specified period of time 1208 elapses after an order crossing 526 without a move in the prices 512 and 514 of the BBO. At time 1210, the auction may begin once the specified period of time 1208 occurs without a move in the auction price 1202, which is set to 10.5.

At times 518 and 516, even though the BBO changes, the auction price 1002 remains fixed at 10.5. In this example, the trade would occur at the order uncrossing 528, where a trade of 65 shares at 10.5 occurs. Here, BBO band changes during the call phase do not affect the auction price 1102, which prevents further BBO price band manipulation opportunities. In one example embodiment, if the auction price 1102 is outside the BBO at the order uncross 528, the auction is cancelled. Orders may not be cancelled during the call phase.

Figure 13:
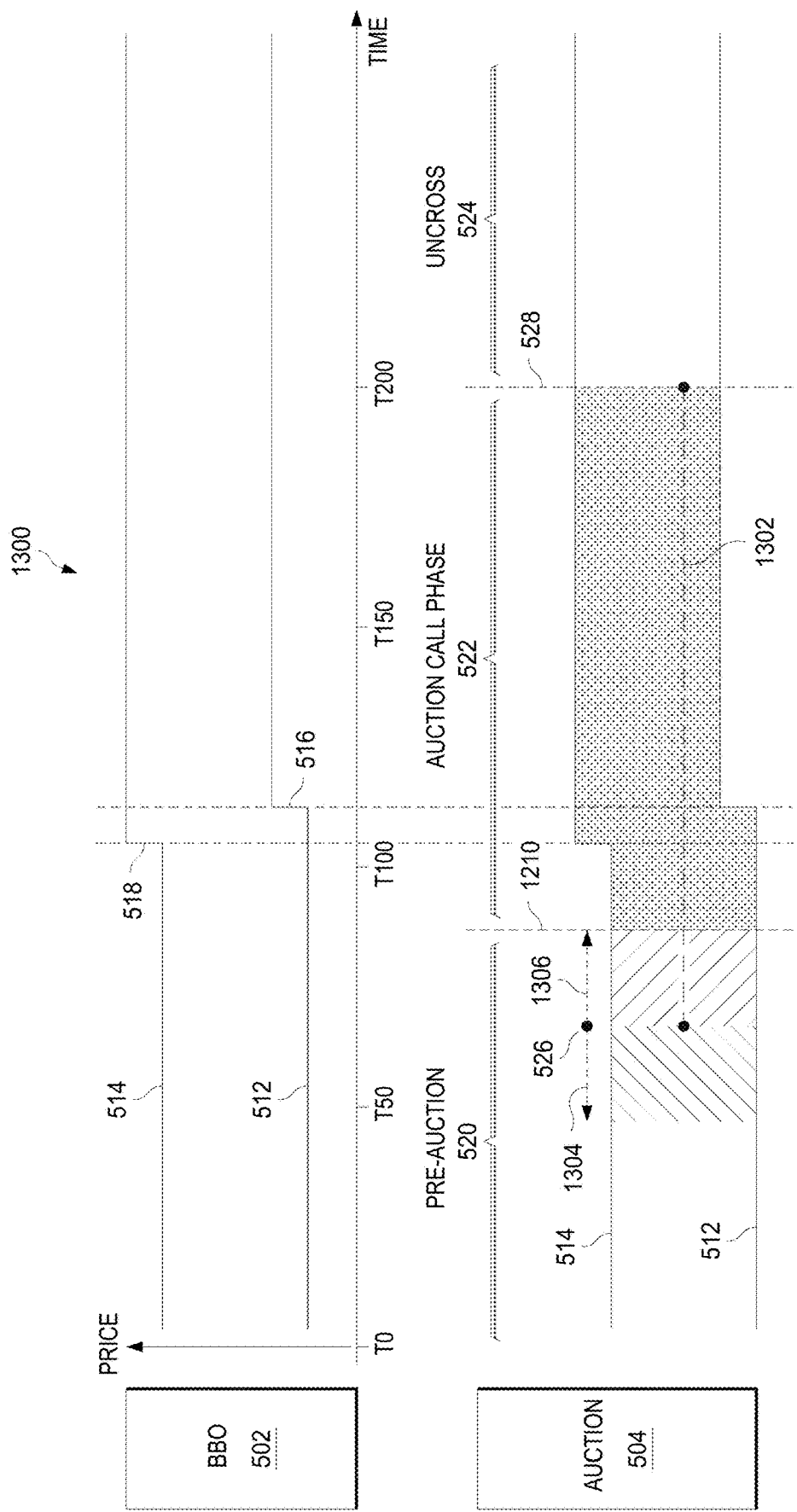
FIG. 13 illustrates a time series diagram with lookback and look forward periods according to an embodiment of this disclosure.

FIG. 13 illustrates a time series diagram 1300 with lookback and look forward periods according to an embodiment of this disclosure. The actions in the time series diagram 1300 can be performed by a processor implementing matching engine 104 as shown in system 100 of FIG. 1.

Time series diagram 1300 includes an BBO timeline 502 and an auction timeline 504. During the timelines 502 and 504, orders can be placed and market data may change. Time series diagram 1300 depicts price in a vertical direction and time in a horizontal direction.

The BBO timeline 502 includes a BBO band using market data. The BBO band has a bid price 512 and an offer price 514. In this example, the bid price 512 is 10 at time T0 and the offer price 514 is 10.8. A time 518 the offer price 514 changes to 11.2, and at time 516 the bid price 512 changes to 10.2.

The auction timeline 504 includes a pre-auction phase 520, an auction call phase 522, and an uncross phase 524. The pre-auction phase 520 is the time prior to the auction call phase 522. The auction call phase 522 lasts until order uncrossing 528. The uncross phase 524 occurs after order uncrossing 528. During these phases, the matching engine consumes order messages from trading members and the BBO price band feed as shown in the BBO timeline 502 and auction timeline 504. The matching engine uses the pricing process to establish an auction price 1302. The matching engine then processes an auction whereby the price created is published and further order messages can be submitted, referred to as the auction call phase 522. The call phase 522 is the period when the auction publishes the price and volume which best satisfy the auction process. At the end of the call phase, the auction will "uncross" at order uncrossing 528 and create trades based on the prioritization logic in the pricing process of the uncross phase 524.

In FIG. 13, during the pre-auction phase 520, a midpoint peg order of "Sell 75 at mid" is entered. The auction price 1302 and volume are both zero at this time. When a buy order of "Buy 65 at limit=10.5" is received, the orders cross to create order crossing 526. In this embodiment, the auction will not begin if the BBO band moves within a specified period of time before or after the orders crossing 526. That is, the matching engine will not set the auction price 1302 until a specified period of time 1304 elapses before and a specified period of time 1306 after an order crossing 526 without a move in the prices 512 and 514 of the BBO. At time 1308, the auction may begin where the auction price 1302 is set to 10.5.

At times 518 and 516, even though the BBO changes, the auction price 1002 remains fixed at 10.5. In this example, the trade would occur at the order uncrossing 528, where a trade of 65 shares at 10.5 occurs. Here, BBO band changes during the call phase do not affect the auction price 1102, which prevents further BBO price band manipulation opportunities. In one example embodiment, if the auction price 1302 is outside the BBO at the order uncross 528, the auction is cancelled. Orders may not be cancelled during the call phase.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "applications" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for prevention of manipulation in an electronic trading system comprising:
   using at least one processing device:
      obtaining a first plurality of orders related to an asset from an electronic trading system;
      identifying a first value for the asset to be used during an intraday auction involving the asset, the identified first value based on a first detected order cross within the first plurality of orders, wherein the first value is identified and set prior to the intraday auction, the first value is located within a best bid and best offer spread (BBO) band, and changes to the BBO band during the intraday auction do not affect the identified and set first value;
      determining whether the BBO band has remained unchanged for a specified time period after the first detected order cross; and
      responsive to determining that the BBO band changed during the specified time period after the first detected order cross:
         obtaining a second plurality of orders related to the asset from the electronic trading system,
         identifying a second value for the asset to be used during the intraday auction involving the asset, the identified value based on a second detected order cross within the second plurality of orders,
         determining whether the BBO band has remained unchanged for the specified time period after the second detected order cross, and
         responsive to determining that the BBO band remained unchanged during the specified time period after the second detected order cross, initiating the intraday auction involving the asset based on the identified and set second value and the second detected order cross.

2. The method of claim 1, further comprising:
   determining that the BBO band has not changed for a specified time before the second detected order cross;
   wherein the intraday auction is initiated based on the determination.

3. The method of claim 2, wherein initiating the intraday auction is further responsive to determining that the BBO band has not changed for the specified time before the second detected order cross.

4. The method of claim 3, wherein the specified period of time restarts if a change in the BBO band is detected.

5. The method of claim 1, wherein the specified period of time restarts if a change in the BBO band is detected.

6. The method of claim 1, further comprising:
   creating trades using order messages associated with the intraday auction based on a prioritization.

7. The method of claim 1, further comprising:
   receiving conditional offers for the asset during the intraday auction; and
   matching the conditional offers from different parties.

8. An apparatus comprising:
   at least one processing device; and
   at least one memory storing instructions that, when executed by the at least one processing device, cause the at least one processing device to perform:
      obtaining a first plurality of orders related to an asset from an electronic trading system;
      identifying a first value for the asset to be used during an intraday auction involving the asset, the identified first value based on a first detected order cross within the first plurality of orders, wherein the first value is identified and set prior to the intraday auction, the first value is located within a best bid and best offer spread (BBO) band, and changes to the BBO band during the intraday auction do not affect the identified and set first value;
      determining whether the BBO band has remained unchanged for a specified time period after the first detected order cross; and
      responsive to determining that the BBO band changed during the specified time period after the first detected order cross:
         obtaining a second plurality of orders related to the asset from the electronic trading system,
         identifying a second value for the asset to be used during the intraday auction involving the asset, the identified value based on a second detected order cross within the second plurality of orders,
         determining whether the BBO band has remained unchanged for the specified time period after the second detected order cross, and
         responsive to determining that the BBO band remained unchanged during the specified time period after the second detected order cross, initiating the intraday auction involving the asset based on the identified and set second value and the second detected order cross.

9. The apparatus of claim 8, wherein the at least one processing device is further configured to perform:
   determining that the BBO band has not changed for a specified time before the second detected order cross;
   wherein the intraday auction is initiated based on the determination.

10. The apparatus of claim 9, wherein initiating the intraday auction is further responsive to determining that the BBO band has not changed for the specified time before the second detected order cross.

11. The apparatus of claim 10, wherein the specified period of time restarts if a change in the BBO band is detected.

12. The apparatus of claim 8, wherein the specified period of time restarts if a change in the BBO band is detected.

13. The apparatus of claim 8, wherein the at least one processing device is further configured to perform:
    creating trades using order messages associated with the intraday auction based on a prioritization.

14. The apparatus of claim 8, wherein the at least one processing device is further configured to perform:
    receiving conditional offers for the asset during the intraday auction; and
    matching the conditional offers from different parties.

15. A non-transitory computer readable medium containing instructions that, when executed by at least one processing device, cause the at least one processing device to perform operations comprising:
    obtaining a first plurality of orders related to an asset from an electronic trading system;
    identifying a first value for the asset to be used during an intraday auction involving the asset, the identified first value based on a first detected order cross within first plurality of the orders, wherein the value is identified and set prior to the intraday auction, the first value is located within a best bid and best offer spread (BBO) band, and changes to the BBO band during the intraday auction do not affect the identified and set first value;
    determining whether the BBO band has remained unchanged for a specified time period after the first detected order cross; and
    responsive to determining that the BBO band changed during the specified time period after the first detected order cross:
        obtaining a second plurality of orders related to the asset from the electronic trading system,
        identifying a second value for the asset to be used during the intraday auction involving the asset, the identified value based on a second detected order cross within the second plurality of orders,
        determining whether the BBO band has remained unchanged for the specified time period after the second detected order cross, and
        responsive to determining that the BBO band remained unchanged during the specified time period after the second detected order cross, initiating the intraday auction involving the asset based on the identified and set second value and the second detected order cross.

16. The non-transitory computer readable medium of claim 15, wherein the operations further comprise:
    determining that the BBO band has not changed for a specified time before the second detected order cross;
    wherein the intraday auction is initiated based on the determination.

17. The non-transitory computer readable medium of claim 15, wherein initiating the intraday auction is further responsive to determining that the BBO band has not changed for the specified time before the second detected order cross.

18. The non-transitory computer readable medium of claim 17, wherein the specified period of time restarts if a change in the BBO band is detected.

19. The non-transitory computer readable medium of claim 15, wherein the operations further comprise:
    creating trades using order messages associated with the intraday auction based on a prioritization.

20. The non-transitory computer readable medium of claim 15, wherein the operations further comprise:
    receiving conditional offers for the asset during the intraday auction; and
    matching the conditional offers from different parties.

* * * * *

UNITED STATES PATENT AND TRADEMARK OFFICE
CERTIFICATE OF CORRECTION

PATENT NO. : 10,628,885 B2
APPLICATION NO. : 15/961684
DATED : April 21, 2020
INVENTOR(S) : Paul M. Brennan and Charles Broussin It is certified that error appears in the above-identified patent and that said Letters Patent is hereby corrected as shown below:

In the Specification

In Column 3, Line 55: "architecture 100" to read as --architecture--
In Column 4, Line 4: "architecture 100" to read as --architecture--
In Column 4, Line 12: "system 100" to read as --system 102--
In Column 4, Line 25: "system 100" to read as --system 102--
In Column 4, Line 35: "system 100" to read as --system 102--
In Column 4, Line 61: "system 100" to read as --system 102--
In Column 4, Line 62: "system 100" to read as --system 102--
In Column 4, Line 65: "system 100" to read as --system 102--
In Column 5, Lines 1-2: "system 100" to read as --system 102--
In Column 5, Line 3: "system 100" to read as --system 102--
In Column 5, Line 14: "system 100" to read as --system 102--
In Column 5, Line 15: "system 100" to read as --system 102--
In Column 5, Line 46: "and no there is no further BBO change" to read as --and no further BBO change--
In Column 6, Line 5: "system 100" to read as --system 102--
In Column 6, Line 10: "system 100" to read as --system 102--
In Column 6, Line 11: "system 100" to read as --system 102--
In Column 6, Line 12: "that uses separate tab" to read as --that uses separate tabs--
In Column 7, Line 33: "system 100" to read as --system 102--
In Column 8, Line 14: "system 100" to read as --system 102--
In Column 10, Line 46: "system 100" to read as --system 102--
In Column 10, Line 48: "system 100" to read as --system 102--
In Column 10, Line 54: "system 100" to read as --system 102--
In Column 11, Line 39: "system 100" to read as --system 102--
In Column 12, Line 23: "system 100" to read as --system 102--
In Column 13, Line 8: "system 100" to read as --system 102--
In Column 13, Line 58: "system 100" to read as --system 102--
In Column 14, Line 48: "system 100" to read as --system 102--

Signed and Sealed this
Eleventh Day of August, 2020

Andrei Iancu
*Director of the United States Patent and Trademark Office*

CERTIFICATE OF CORRECTION (continued)
U.S. Pat. No. 10,628,885 B2

In Column 15, Line 25: "the a BBO manipulation" to read as --the BBO manipulation--
In Column 15, Line 31: "price 1001" to read as --price 1002--
In Column 15, Line 44: "system 100" to read as --system 102--
In Column 15, Line 53: "time 515" to read as --time 1104--
In Column 16, Line 39: "system 100" to read as --system 102--
In Column 16, Line 50: "time 515" to read as --time 1204--
In Column 17, Line 6: "during at this time" to read as --at this time--
In Column 17, Line 40: "system 100" to read as --system 102--
In Column 18, Line 14: "time 1308" to read as --time 1210--